United States Patent
Lu et al.

(10) Patent No.: US 11,461,654 B2
(45) Date of Patent: Oct. 4, 2022

(54) MULTI-AGENT COOPERATION DECISION-MAKING AND TRAINING METHOD

(71) Applicant: Peking University, Beijing (CN)

(72) Inventors: Zongqing Lu, Beijing (CN); Jiechuan Jiang, Beijing (CN)

(73) Assignee: Peking University, Beijing (CN)

( * ) Notice: Subject to any disclaimer, the term of this patent is extended or adjusted under 35 U.S.C. 154(b) by 474 days.

(21) Appl. No.: 16/655,783

(22) Filed: Oct. 17, 2019

(65) Prior Publication Data

US 2020/0125957 A1   Apr. 23, 2020

(30) Foreign Application Priority Data

Oct. 17, 2018   (CN) .......................... 201811210985.5

(51) Int. Cl.
| | |
|---|---|
| *G06N 3/08* | (2006.01) |
| *G06F 16/901* | (2019.01) |
| *G06F 17/15* | (2006.01) |
| *G06F 17/16* | (2006.01) |
| *G06N 3/04* | (2006.01) |

(52) U.S. Cl.
CPC ......... *G06N 3/084* (2013.01); *G06F 16/9024* (2019.01); *G06F 17/15* (2013.01); *G06F 17/16* (2013.01); *G06N 3/0472* (2013.01)

(58) Field of Classification Search
None
See application file for complete search history.

(56) References Cited

U.S. PATENT DOCUMENTS

| | | |
|---|---|---|
| 2015/0193583 A1 | 7/2015 | McNair et al. |
| 2018/0285678 A1 | 10/2018 | Baum et al. |

(Continued)

FOREIGN PATENT DOCUMENTS

| | | |
|---|---|---|
| CN | 104463191 A | 3/2015 |
| CN | 105898288 A | 8/2016 |

(Continued)

OTHER PUBLICATIONS

First Office Action dated Apr. 13, 2020 received in Chinese Patent Application No. CN 201811210985.5 together with an English language translation.

(Continued)

*Primary Examiner* — Craig C Dorais
(74) *Attorney, Agent, or Firm* — Scully Scott Murphy & Presser

(57) ABSTRACT

The present invention provides a multi-agent cooperation decision-making and training method, including the following steps: S1: encoding, by an encoder, local observations obtained by agents by using a multi-layer perceptron or a convolutional neural network as feature vectors in a receptive field; S2: calculating, by a graph convolution layer, relationship strength between the agents by using a relationship unit of a multi-headed attention mechanism, integrating, by a relationship convolution kernel of the relationship unit, the feature vectors in the receptive field into new feature vectors, and iterating the graph convolution layer for multiple times to obtain a relationship description of the multi-headed attention mechanism in a larger receptive field and at a higher order; S3: splicing the feature vectors in the receptive field and the new feature vectors integrated by the graph convolution layer, sending the spliced vectors to a value network, wherein the value network selects and performs an action decision with the highest future feedback expectation; and S4: storing a local observation set and related sets of the agents in a buffer region, collecting samples in the buffer region for training, and optimizing and rewriting a loss function.

9 Claims, 1 Drawing Sheet

(56) References Cited

U.S. PATENT DOCUMENTS

2021/0349954 A1* 11/2021 Renders ................. G06F 16/65
2021/0382963 A1* 12/2021 Belbute-Peres ...... G06N 3/0445
2022/0075945 A1* 3/2022 Zhang .................. G06F 40/205

FOREIGN PATENT DOCUMENTS

| CN | 106970615 A | 7/2017 |
|---|---|---|
| CN | 108197698 A | 6/2018 |
| CN | 108388900 A | 8/2018 |
| CN | 108628823 A | 10/2018 |

OTHER PUBLICATIONS

Celikyilmaz, A. et al., "Deep Communicating Agents for Abstractive Summarization", 2018, pp. 1-14.
Foerster, J. et al., "Learning to Communicate with Deep Multi-Agent Reinforcement Learning", 2016, pp. 1-13.
Iqbal, S. et al., "Actor-Attention-Critic for Multi-Agent Reinforcement Learning", 2018, pp. 1-12.
Zhang, T., "Study on target tracking algorithm for mobile robot based on visual attention mechanism", China Master's Theses Full-text Database, Section of Information Technology, Second Edition of 2017, Feb. 15, 2017, pp. 1-108.
Guo, Q., "Research and Application of Decision-making Model for Video Games Based on Deep Reinforcement-Learning", China Master's Theses Full-text Database, Section of Information Technology, Seventh Edition of 2018, Jul. 15, 2018, pp. 1-68.
Kobayashi, K. et al., "Cooperative Behavior Acquisition in Multi-agent Reinforcement Learning System Using Attention Degree", Neural Information Processing, 2012, pp. 537-544, vol. 7665.

\* cited by examiner

MULTI-AGENT COOPERATION DECISION-MAKING AND TRAINING METHOD

FIELD OF THE INVENTION

The present invention relates to the field of deep reinforcement learning, and more particularly relates to a multi-agent cooperation decision-making and training method.

BACKGROUND OF THE INVENTION

Deep reinforcement learning has surpassed the human level in game tasks such as the game of go, and has gradually been applied to the field of automatic control such as automatic driving. In reinforcement learning, an agent selects an action with the highest expectation of return by observing a state of an environment, and receives a feedback from the environment. Training is done by a time series differential method or a strategy gradient method, or an actor-critic algorithm combining the two methods. However, when there are multiple agents in the environment, each interest-driven agent only pursues the maximization of its own interests and tends to ignore the overall interests of the team, which makes a cooperation strategy difficult to achieve. Each agent regards other agents as part of the environment, and the strategies of other agents may change, which makes the environment unstable and brings some difficulties to the training.

At present, some multi-agent algorithms adopt a framework of centralized training and decentralized execution, such as MADDPG. A critic network receives the states and actions of all other agents, thus avoiding the unstable problem of the environment. However, on another aspect, this architecture requires information of all the agents in the environment, and a decision-making network needs to be trained for each agent. The training is costly and is difficultly applied to a large-scale distributed method. Some models promote cooperation between the agents through communication. CommNet uses continuous communication signals to solve a cooperation situation. At each time step, a hidden layer state of each agent is arithmetically calculated to obtain a mean serving as an input of a next layer of neural network. BiCNet uses a recurrent neural network to connect the decision-making networks of all the agents with a value network to better realize information sharing. The communication method promotes the cooperation to a certain extent, but in a real situation, especially in a large-scale multi-agent environment, these methods are limited by problems such as a communication delay, a bandwidth and information redundancy. For the large-scale agent situation, a Mean Field method proposes that an average action of surrounding adjacent agents are used as an input to represent the influence of other agents on a center agent.

A graph convolution network has achieved good results on irregular data sets and even data sets located in a non-European space, such as a social network, a 3D point cloud and protein molecules. A convolution-like operation is used to perform regression or classification on a graph structure to predict hidden point features and edge features. A relationship network is designed to learn about relationships between entities and to predict future states by analyzing the relationships between the entities.

SUMMARY OF THE INVENTION

The objective of the present invention is implemented by the following technical solution.

A multi-agent cooperation decision-making and training method is provided, including the following steps: S1: encoding, by an encoder, local observations obtained by agents by using a multi-layer perceptron or a convolutional neural network as feature vectors in a receptive field; S2: calculating, by a graph convolution layer, relationship strength between the agents by using a relationship unit of amulti-headed attention mechanism, integrating, by a relationship convolution kernel of the relationship unit, the feature vectors in the receptive field into new feature vectors, and iterating the graph convolution layer for multiple times to obtain a relationship description of the multi-headed attention mechanism in a larger receptive field and at a higher order; S3: splicing the feature vectors in the receptive field and the new feature vectors integrated by the graph convolution layer, sending the spliced vectors to a value network, wherein the value network selects and performs an action decision with the highest future feedback expectation; S4: storing a local observation set and related sets of the agents in a buffer region, collecting samples in the buffer region for training, and optimizing and rewriting a loss function.

Specifically, at any moment, if the local observation acquired by each agent is low-dimensional vector data, the encoder performs the encoding by using the multi-layer perceptron;

if the local observation acquired by each agent is a visual image input, the encoder performs the encoding by using the convolutional neural network.

Specifically, in each layer of graph convolution operation, each agent acquires the feature vector in the receptive field through a communication channel; the feature vectors of all the agents are spliced into one feature matrix $F_t$ in a size of N×L, wherein N is a total number of the agents in the environment, and L is a length of the feature vector;

an adjacent matrix $C_t^i$ in a size of (K+1)×N is constructed for each agent i, and K is the number of the agents in the receptive field, and t is the time;

the first line of the adjacent matrix $C_t^i$ is expressed by a one-hot of an index of the agent i, and the residual jth line is expressed by a one-hot of an index of an agent j in the receptive field; and a feature vector set $C_t^i \times F_t$ in a local region of the agent i is obtained through point multiplication operation.

Specifically, the relationship strength is expressed by:

$$\alpha_{ij} = \frac{\exp(\tau[W_q h^i \cdot (W_k h^j)^T])}{\sum_{e \in \varepsilon_i} \exp(\tau[W_q h^i \cdot (W_k h^e)^T])}$$

where $\alpha_{ij}$ is a strength relationship between the agent i and the agent j; $\varepsilon_i$ is the local region of the agent i, and includes k adjacent agents and a center agent; $\tau$ is a scale factor; $h^i$ represents a feature vector of the agent i; similarly, j and e represent agents; T represents matrix transposition; $W_q$ and $W_k$ are respectively a query vector parameter and a key vector parameter of each attention head to be learnt; q is query; and k is key.

Specifically, the new feature vectors generated by the multi-headed attention mechanism are weighted and averaged according to the relationship strength, and a feature vector $h^{i'}$ of this layer of graph convolution is obtained through a nonlinear transformation function σ:

$$h^{i'} = \sigma\left(\frac{1}{M}\sum_{m=1}^{M}\sum_{j\in\varepsilon_i}\alpha_{ij}^m W_v^m h^j\right)$$

Where $W_v$ is a value vector parameter of each attention head to be learnt; v is value, and M is the number of attention heads.

Specifically, the value network generates an expected value of future feedback for each feasible action, and executes an action with the highest expected value by a probability of $1-\epsilon$, or a random action by a probability of $\epsilon$; and $\epsilon$ represents an execution probability, and is more than or equal to 0 and less than or equal to 1.

Specifically, after the value network executes each action, a quintuple (O, A, O', R, C) is stored in the buffer region. $O=\{o_1, o_2, \ldots, o_N\}$ represents a local observation set of the agents at the current time step; $A=\{a_1, a_2, \ldots, a_N\}$ represents an action set selected by the agents; $O'=\{o_1', o_2', \ldots, o_N'\}$ represents a local observation set of the agents at the next time step; $R=\{r_1, r_2, \ldots, r_N\}$ represents a real-time environment feedback set obtained by the agents; and C represents a local connection structure of the agents.

Specifically, the training is performed by using time series differential learning of Q-learning. A small set including S samples is randomly sampled from the buffer region at each time, and the loss function is optimized by a back propagation method:

$$\mathcal{L}(\theta) = \frac{1}{S}\sum_S \frac{1}{N}\sum_{i=1}^{N}(y_i - Q(O_i, a_i; \theta))^2$$

$$y_i = r_i + \gamma \max_{a_i'} Q(O_i', a_i'; \theta')$$

where $O_i$ represents a local observation set of the agent i in the receptive field; $O_i'$ represents a local observation set of the agent i in the receptive field at the next time step; $a_i'$ represents an action of the agent i at the next time step; $\gamma$ is a discount factor; $\theta$ is a current network parameter; $\theta'$ is a target network parameter;

the target network parameter is updated by using the following rule:

$$\theta' = \beta\theta + (1-\beta)\theta'$$

$\beta$ is a soft update super parameter.

Specifically, a regular term, which is a KL divergence represented by a relationship at a higher order in two continuous steps, is added into the loss function, and the loss function is rewritten as:

$$\mathcal{L}(\theta) = \frac{1}{S}\sum_S \frac{1}{N}\sum_{i=1}^{N}(y_i - Q(O_i, a_i; \theta))^2 + \lambda D_{KL}(R(O_i; \theta) \| R(O_i'; \theta))$$

where $D_{KL}(\|)$ is a KL divergence calculation function; and $R(O_i; \theta)$ is an attention parameter distribution represented by a relationship of the agent i on a certain convolution layer.

The present invention has the advantages that in the present invention, the graph convolution layer uses the relationship unit of the multi-headed attention mechanism to integrate the feature vectors in the receptive field. As the number of convolution layers increases, the relationship convolution kernel can effectively extract relationships at higher orders, which is conductive to the emergence of a complicated cooperation phenomenon. Weights of all modules are shared, which will significantly reduce the number of parameters and accelerate the training process, and the weights are not limited by the number of the agents in the execution process. The agents only need to communicate with each other at a limited bandwidth to acquire information of adjacent agents. The method is favorably deployed in a large-scale distributed decision method.

BRIEF DESCRIPTION OF THE DRAWINGS

Various other advantages and benefits will become apparent to those of ordinary skill in the art by reading detailed descriptions of the following specific implementations. The drawings are only for the purpose of illustrating the specific implementations and are not intended to limit the present invention. Throughout the drawings, the same reference numerals are used to refer to the same parts. In the drawings.

DETAILED DESCRIPTION OF THE EMBODIMENTS

Figure 1:
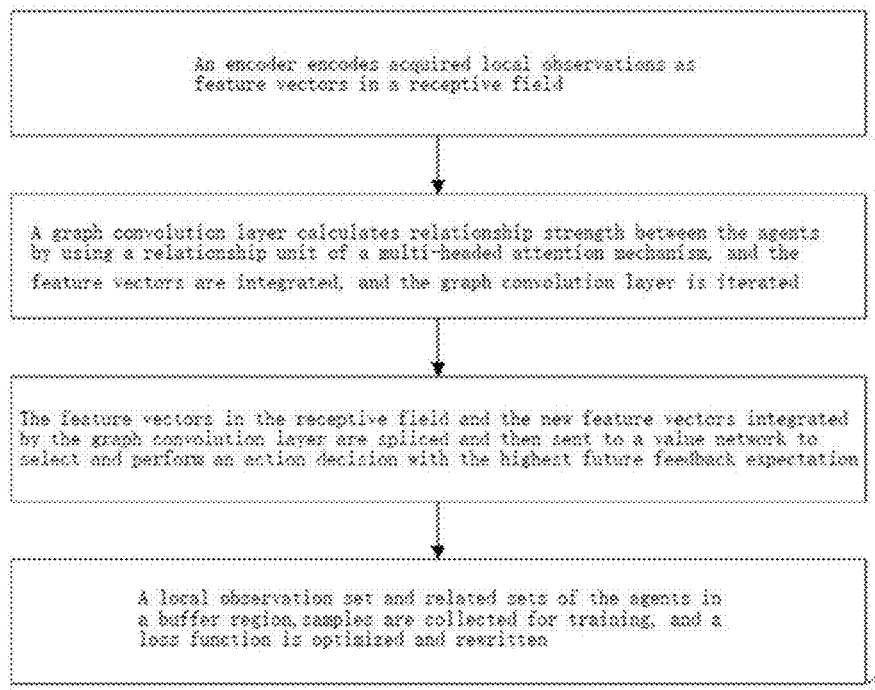
FIG. 1 schematically shows a flow chart of a decision and training method according to an implementation of the present invention.

Exemplary implementations of the present invention will be described in more detail below with reference to the accompanying drawings. Although the exemplary implementations of the present invention are shown in the drawings, it should be understood that the present invention may be embodied in various forms and not limited by the embodiments set forth herein. Rather, these implementations are provided so that the present invention will be more fully understood, and the scope of the present invention can be fully conveyed to those skilled in the art.

According to an implementation of the present invention, a multi-agent cooperation decision-making and training method is provided, which is based on a multi-agent reinforcement learning framework (DGN) of a graph convolution model relationship mechanism. This framework can better promote a cooperation behavior between agents.

In the method, a multi-agent environment is regarded as a graph, and agents are used as nodes in the graph, and local observations obtained by the agents in the environment are used as attributes of the nodes. Each node is bordered by the surrounding K nodes. This mainly considers that the behavior of each agent mainly affects other agents that are adjacent to it. Furthermore, in an actual large-scale multi-agent environment, in consideration that the impact of all the agents will bring an extremely high bandwidth and computational complexity cost, a large amount of redundant information will even interfere with decisions. The multi-agent environment graph is located in an irregular non-European space, and as the environment and the number and positions of the agents change, a potential relationship graph structure changes continuously. An adaptive graph convolution framework is very suitable for such data.

In the multi-agent environment with one local observation, each agent receives one local observation as the attribute of the node at each time step, makes a decision according to the observation and receives a feedback from the environment. The method consists of three modules: an encoding module, a graph convolution layer module, and a value network module. The local observations of the agents are encoded by the encoder as feature vectors. If the observation is low-dimensional data, the encoder uses a multi-layer perceptron, and if the observation is an original image input, the encoder uses a convolutional neural network. Convolution layers integrate the feature vectors in a local region, including a center agent and K adjacent agents, and generate new feature vectors. Through stacking of the convolution layers, a receptive field of the agents is gradually increased, and the agents may acquire a more global perspective and a wider range of cooperation. The feature vector generated by each convolution layer has a unique contribution to a final decision, and is fully coupled and sent to a final value network. The value network selects and performs an action with the highest future feedback expectation.

The key to solve multiple agents is to measure the impact between the agents. In the previous method, a MADDPG (Multi-Agent Deep Deterministic Policy Gradient) has directly trained a centralized critic network that receives observations and actions of all other agents to evaluate this impact. Communication algorithms, such as CommNet, communicate observation information and strategic intents through information sharing. A mean field method uses a mean of the strategies of the adjacent agents to estimate this impact. In this framework, a relationship module is used as a convolution kernel of the graph convolution to integrate the feature vectors inside the receptive field. The relationship unit satisfies two important properties: 1. The relationship unit can more accurately describe a binary relationship between entities, which has been confirmed in many studies, and 2. A result of the relationship unit is independent of the order of the input feature vectors. In this method, the relationship between the agents is calculated by using the relationship unit of a multi-headed attention mechanism. As the number of convolution layers increases, the relationship convolution kernel can effectively extract relationships at higher orders, which is conductive to the emergence of a complicated cooperation phenomenon.

In the aforementioned architecture, weights of all the modules are shared, which will significantly reduce the number of parameters and accelerate a training process, and the weights are not limited by the number of the agents in the execution process. The agents only need to communicate with each other at a limited bandwidth to acquire information of the K adjacent agents. The method is favorably deployed in a large-scale distributed decision method.

A multi-agent cooperation decision-making and training method, as shown in FIG. 1, includes the following steps that: S1: an encoder encodes local observations obtained by agents by using a multi-layer perceptron or a convolutional neural network as feature vectors in a receptive field; S2: a graph convolution layer calculates relationship strength between the agents by using a relationship unit of a multi-headed attention mechanism, and a relationship convolution kernel of the relationship unit integrates the feature vectors in the receptive field into new feature vectors, and the graph convolution layer is iterated for multiple times to obtain a relationship description of the multi-headed attention mechanism in a larger receptive field and at a higher order; S3: the feature vectors in the receptive field and the new feature vectors integrated by the graph convolution layer are spliced and then sent to a value network, wherein the value network selects and performs an action decision with the highest future feedback expectation; and S4: a local observation set and related sets of the agents in a buffer region, samples in the buffer region are collected for training, and a loss function is optimized and rewritten.

Figure 2:
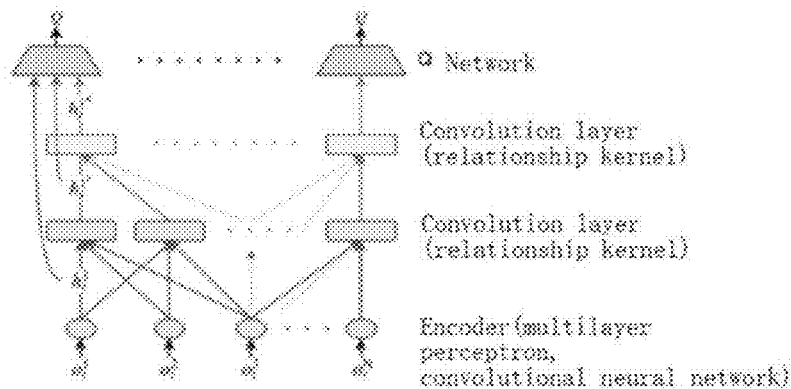
FIG. 2 schematically shows a decision flow chart according to an implementation of the present invention.
Figure 3:
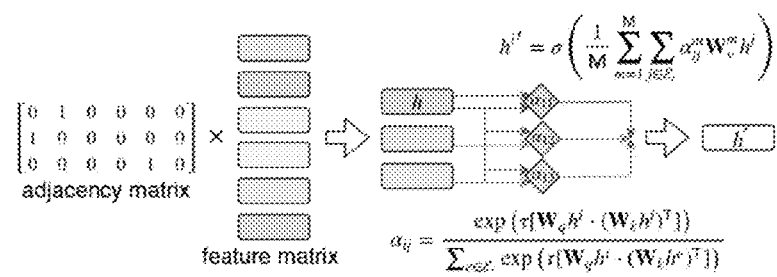
FIG. 3 schematically shows a flow chart of integrating feature vectors according to an implementation of the present invention.

An overall decision-making process based on the encoder, the graph convolution layer and the value network is as shown in FIG. 2.

In each layer of graph convolution operation of the graph convolution layer, each agent acquires the feature vectors in the receptive field through a communication channel; the feature vectors of all the agents are spliced into one feature matrix $F_t$ in a size of N×L, wherein N is a total number of the agents in the environment, and L is a length of the feature vector; an adjacent matrix $C_t^i$ in a size of (K+1)×N is constructed for each agent i, and K is the number of the agents in the receptive field, and t is the time; the first line of the adjacent matrix $C_t^i$ is expressed by a one-hot of an index of the agent i, and the residual jth line is expressed by a one-hot of an index of the jth agent in the receptive field; and a feature vector set $C_t^i \times F_t$ in a local region of the agent i is obtained through point multiplication operation.

The relationship strength, calculated by using the relationship unit of the attention mechanism, between the agents is expressed by:

$$\alpha_{ij} = \frac{\exp(\tau[W_q h^i \cdot (W_k h^j)^T])}{\sum_{e \in \varepsilon_i} \exp(\tau[W_q h^i \cdot (W_k h^e)^T])}$$

where $\alpha_{ij}$ is a strength relationship between the agent i and the agent j; $\varepsilon_i$ is the local region of the agent i, and includes k adjacent agents and a center agent; $\tau$ is a scale factor; $h^i$ represents a feature vector of the agent i; similarly, j and e represent agents; $\alpha_{ij}$ is a strength relationship between the agents; T represents matrix transposition; $W_q$ and $W_k$ are respectively a query vector parameter and a key vector parameter of each attention head to be learnt; q is query; and k is key.

The new feature vectors generated by the multi-headed attention mechanism are weighted and averaged according to the relationship strength, and a feature vector of this layer of convolution is obtained through a nonlinear transformation function σ (one layer of MLP (multilayer perceptron) taking Relu as an activation function):

$$h^{i'} = \sigma\left(\frac{1}{M}\sum_{m=1}^{M}\sum_{j \in \varepsilon_i} \alpha_{ij}^m W_v^m h^j\right)$$

Where $W_v$ is a value vector parameter of each attention head to be learnt; v is value, and M is the number of attention heads.

The value network generates an expected value of future feedback for each feasible action, and executes an action with the highest expected value by a probability of 1−∈, or a random action by a probability of ∈; and ∈ represents an execution probability, and is more than or equal to 0 and less than or equal to 1.

After the value network executes each action, a quintuple (O, A, O', R, C) is stored in the buffer region. O={$o_1$, $o_2$, ..., $o_N$} represents a local observation set of the agents at the current time step; A={$a_1$, $a_2$, ..., $a_N$} represents an action set selected by the agents; O={($o_1$', $o_2$', ..., $o_N$'} represents a local observation set of the agents at the next time step; R={$r_1$, $r_2$, ..., $r_N$} represents a real-time environment feedback set obtained by the agents; and C represents a local connection structure of the agents.

The training is performed by using time series differential learning of Q-learning. A small set including S samples is randomly sampled from the buffer region at each time, and the loss function is optimized by a back propagation method:

$$\mathcal{L}(\theta) = \frac{1}{S}\sum_{S}\frac{1}{N}\sum_{i=1}^{N}(y_i - Q(O_i, a_i; \theta))^2$$

$$y_i = r_i + \gamma \max_{a_i'} Q(O_i', a_i'; \theta')$$

where $O_i$ represents a local observation set of the agent i in the receptive field; $O_i'$ represents a local observation set of the agent i in the receptive field at the next time step; $a_i'$ represents an action of the agent i at the next time step; $\gamma$ is a discount factor; $\theta$ is a current network parameter; and $\theta'$ is a target network parameter; the target network parameter is updated by using the following rule:

$$\theta' = \beta\theta + (1-\beta)\theta'$$

$\beta$ is a soft update super parameter. In order to guarantee the training stability, connection structures between the agents are maintained unchanged within two continuous steps in the training process.

A regular term, which is a KL divergence represented by relationship at a higher order within the two continuous steps, is added into the loss function, and the loss function is rewritten as:

$$\mathcal{L}(\theta) = \frac{1}{S}\sum_{S}\frac{1}{N}\sum_{i=1}^{N}(y_i - Q(O_i, a_i; \theta))^2 + \lambda D_{KL}(R(O_i; \theta)\|R(O_i'; \theta))$$

where $D_{KL}(\|)$ is a KL divergence calculation function; and $R(O_i; \theta)$ is an attention parameter distribution represented by a relationship of the agent i on a certain convolution layer.

The graph convolution layer uses the relationship unit of the multi-headed attention mechanism to integrate the feature vectors in the receptive field. As the number of convolution layers increases, the relationship convolution kernel can effectively extract relationships at higher orders, which is conductive to the emergence of a complicated cooperation phenomenon. Weights of all the steps are shared, which will significantly reduce the number of parameters and accelerate the training process, and the weights are not limited by the number of the agents in the execution process. The agents only need to communicate with each other at a limited bandwidth to acquire information of adjacent agents. The method is favorably deployed in a large-scale distributed decision method.

The above is only an exemplary specific implementation of the present invention, but the protection scope of the present invention is not limited thereto, and any one skilled in the art can easily think that changes or substitutions within the technical scope of the present invention shall all fall within the protection scope of the present invention. Therefore, the protection scope of the present invention shall be determined by the protection scope of the claims.

The invention claimed is:

1. A multi-agent cooperation decision-making and training method, comprising the following steps:

S1: encoding, by an encoder, local observations obtained by agents by using a multi-layer perceptron or a convolutional neural network as feature vectors in a receptive field;

S2: calculating, by a graph convolution layer, relationship strength between the agents by using a relationship unit of a multi-headed attention mechanism, integrating, by a relationship convolution kernel of the relationship unit, the feature vectors in the receptive field into new feature vectors, and iterating the graph convolution layer for multiple times to obtain a relationship description of the multi-headed attention mechanism in a larger receptive field and at a higher order;

S3: splicing the feature vectors in the receptive field and the new feature vectors integrated by the graph convolution layer, sending the spliced vectors to a value network, wherein the value network selects and performs an action decision with a highest future feedback expectation; and S4: storing a local observation set and related sets of the agents in a buffer region, collecting samples in the buffer region for training, and optimizing and rewriting a loss function.

2. The decision-making and training method according to claim 1, wherein at any moment, if the local observation acquired by each agent is low-dimensional vector data, the encoder performs the encoding by using the multi-layer perceptron;
if the local observation acquired by each agent is a visual image input, the encoder performs the encoding by using the convolutional neural network.

3. The decision-making and training method according to claim 1, wherein in each layer of graph convolution operation, each agent acquires the feature vector in the receptive field through a communication channel;
the feature vectors of all the agents are spliced into one feature matrix $F_t$ in a size of N×L,
wherein N is a total number of the agents in the environment, and L is a length of the feature vector;
an adjacent matrix $C_t^i$ in a size of (K+1)×N is constructed for each agent i, and K is a number of the agents in the receptive field, and t is the time;
the first line of the adjacent matrix $C_t^i$ is expressed by a one-hot of an index of the agent i, and the residual jth line is expressed by a one-hot of an index of an agent j in the receptive field; and a feature vector set $C_t^i \times F_t$ in a local region of the agent i is obtained through point multiplication operation.

4. The decision-making and training method according to claim 3, wherein the relationship strength is expressed by:

$$\alpha_{ij} = \frac{\exp(\tau[W_q h^i \cdot (W_k h^j)^T])}{\sum_{e \in \varepsilon_i} \exp(\tau[W_q h^i \cdot (W_k h^e)^T])}$$

where $\alpha_{ij}$ is a strength relationship between an agent i and an agent j; $\varepsilon_i$ is the local region of the agent i, and includes k adjacent agents and a center agent; $\tau$ is a scale factor; $h^i$ represents a feature vector of the agent i; similarly, j and e represent the agents; T represents matrix transposition; $W_q$ and $W_k$ are respectively a query vector parameter and a key vector parameter of each attention head to be learnt; q is query; and k is key.

5. The decision-making and training method according to claim 4, wherein the new feature vectors generated by the multi-headed attention mechanism are weighted and averaged according to the relationship strength, and a feature vector $h^{i'}$ of this layer of graph convolution is obtained through a nonlinear transformation function σ:

$$h^{i'} = \sigma\left(\frac{1}{M}\sum_{m=1}^{M}\sum_{j\in\varepsilon_i}\alpha_{ij}^m W_v^m h^j\right)$$

where $W_v$ is a value vector parameter of each attention head to be learnt; v is value, and M is the number of attention heads.

6. The decision-making and training method according to claim 5, wherein the value network generates an expected value of future feedback for each feasible action, and executes an action with a highest expected value by a probability of 1−∈, or a random action by a probability of ∈; and ∈ represents an execution probability, and is more than or equal to 0 and less than or equal to 1.

7. The decision-making and training method according to claim 6, wherein after the value network executes each action, a quintuple (O, A, O', R, C) is stored in the buffer region; O={$o_1, o_2, \ldots, o_N$} represents a local observation set of the agents at a current time step; A={$a_1, a_2, \ldots, a_N$} represents an action set selected by the agents; O'={$o_1', o_2', \ldots, o_N'$} represents a local observation set of the agents at a next time step; R={$r_1, r_2, \ldots, r_N$} represents a real-time environment feedback set obtained by the agents; and C represents a local connection structure of the agents.

8. The decision-making and training method according to claim 7, wherein the training is performed by using time series differential learning of Q-learning; a small set including S samples is randomly sampled from the buffer region at each time, and the loss function is optimized by a back propagation method:

$$\mathcal{L}(\theta) = \frac{1}{S}\sum_S \frac{1}{N}\sum_{i=1}^{N}(y_i - Q(O_i, a_i; \theta))^2$$

$$y_i = r_i + \gamma\max_{a_i'} Q(O_i', a_i'; \theta')$$

where $O_i$ represents a local observation set of the agent i in the receptive field; $O_i'$ represents a local observation set of the agent i in the receptive field at the next time step; $\alpha_i'$ represents an action of the agent i at the next time step; γ is a discount factor; θ is a current network parameter; and θ' is a target network parameter;

the target network parameter is updated by using the following rule:

$$\theta' = \beta\theta + (1-\beta)\theta'$$

B is a soft update superparameter.

9. The decision-making and training method according to claim 8, wherein a regular term, which is a KL divergence represented by a relationship at a higher order in two continuous steps, is added into the loss function, and the loss function is rewritten as:

$$\mathcal{L}(\theta) = \frac{1}{S}\sum_S \frac{1}{N}\sum_{i=1}^{N}(y_i - Q(O_i, a_i; \theta))^2 + \lambda D_{KL}(R(O_i; \theta)\|R(O_i'; \theta))$$

where $D_{KL}$ (‖) is a KL divergence calculation function; and R($O_i$;θ) is an attention parameter distribution represented by a relationship of the agent i on a certain convolution layer.

* * * * *